(12) United States Patent
Eade

(10) Patent No.: US 8,473,190 B2
(45) Date of Patent: Jun. 25, 2013

(54) APPARATUS FOR ASSISTING IN PROVIDING A FIRST FIXING GLOBAL POSITIONING SATELLITE SYSTEM, ASSOCIATED APPARATUS AND METHODS

(75) Inventor: Philip Geoffrey Eade, Surrey (GB)

(73) Assignee: Nokia Corporation, Espoo (FI)

( * ) Notice: Subject to any disclaimer, the term of this patent is extended or adjusted under 35 U.S.C. 154(b) by 300 days.

(21) Appl. No.: 12/736,641

(22) PCT Filed: Apr. 25, 2008

(86) PCT No.: PCT/EP2008/003373
§ 371 (c)(1),
(2), (4) Date: Nov. 18, 2010

(87) PCT Pub. No.: WO2009/129826
PCT Pub. Date: Oct. 29, 2009

(65) Prior Publication Data
US 2011/0130151 A1    Jun. 2, 2011

(51) Int. Cl.
*G01C 21/00* (2006.01)
(52) U.S. Cl.
USPC ...................................... 701/400; 455/456.1
(58) Field of Classification Search
USPC ................ 701/400, 516–517, 519, 468–471, 701/408, 412; 455/436–440, 461, 463, 456.1
See application file for complete search history.

(56) References Cited

U.S. PATENT DOCUMENTS 7,443,340 B2 * 10/2008 Abraham et al. ......... 342/357.43
7,801,526 B2 * 9/2010 Newberg et al. .......... 455/435.1
8,060,108 B1 * 11/2011 Rayburn et al. ............ 455/456.1
2004/0203915 A1 10/2004 van Diggelen et al.
2006/0129607 A1 6/2006 Sairo et al.

FOREIGN PATENT DOCUMENTS

| CN | 101076975 | 11/2007 |
|---|---|---|
| CN | 101283616 | 10/2008 |
| WO | WO2006044931 | 4/2006 |

OTHER PUBLICATIONS

Dinesh Manandhar, et al; "GPS Signal Acquisition and Tracking an Approach towards Development of Software-based GPS Receiver"; The Institute of Electronics, Information and Communication Engineers, Tokyo, Japan, 2004; whole document.

Details of references cited in an Office Action dated Aug. 31, 2012 in the counterpart Chinese Patent Application No. 200880129401X, 1 page.

* cited by examiner

*Primary Examiner* — Yonel Beaulieu
(74) *Attorney, Agent, or Firm* — Locke Lord LLP

(57) ABSTRACT

There is provided a method for assisting in providing a first fix in a global positioning satellite system, the method comprising: storing of connection point association data for a network connection point, observed by a portable electronic device, for subsequent use in assisting in providing a first fix, the connection point association data providing for approximation of the position of a device at the observed network connection point by associating together connection point identifiers of the observed network connection point and one or more other network connection points to allow for positional data used for determining the position at one or more other network connection points to be used for the approximation of the position of the device at the observed network connection point.

19 Claims, 5 Drawing Sheets

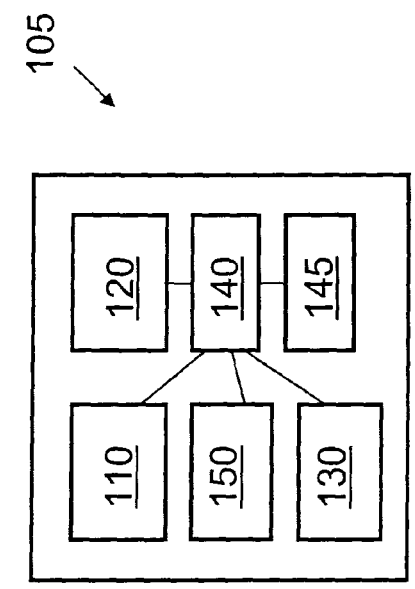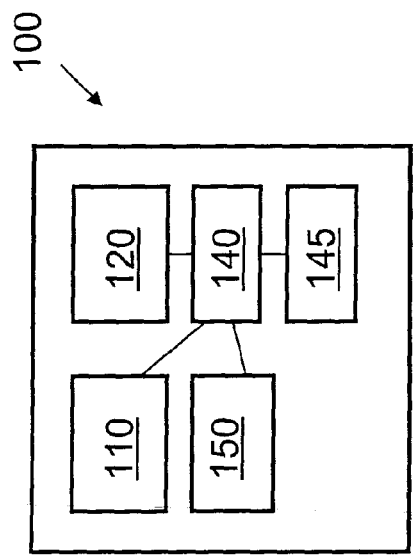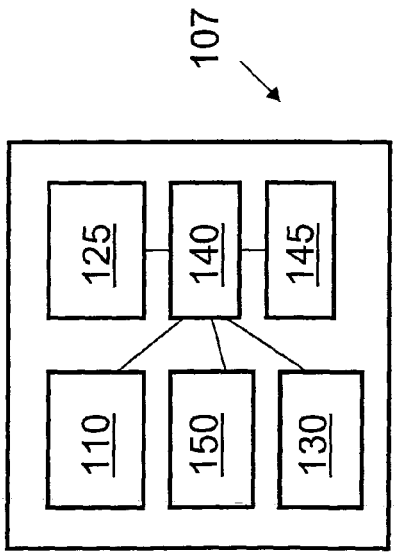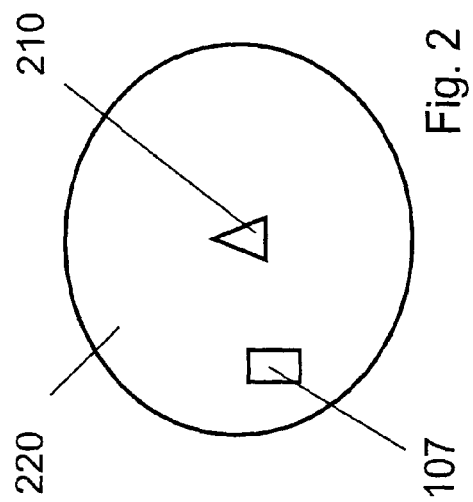

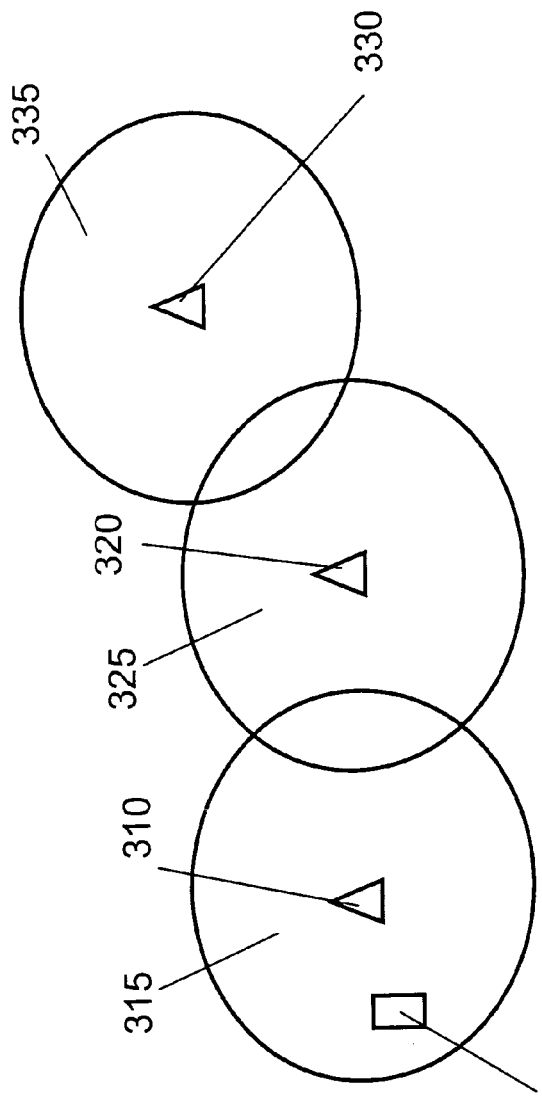
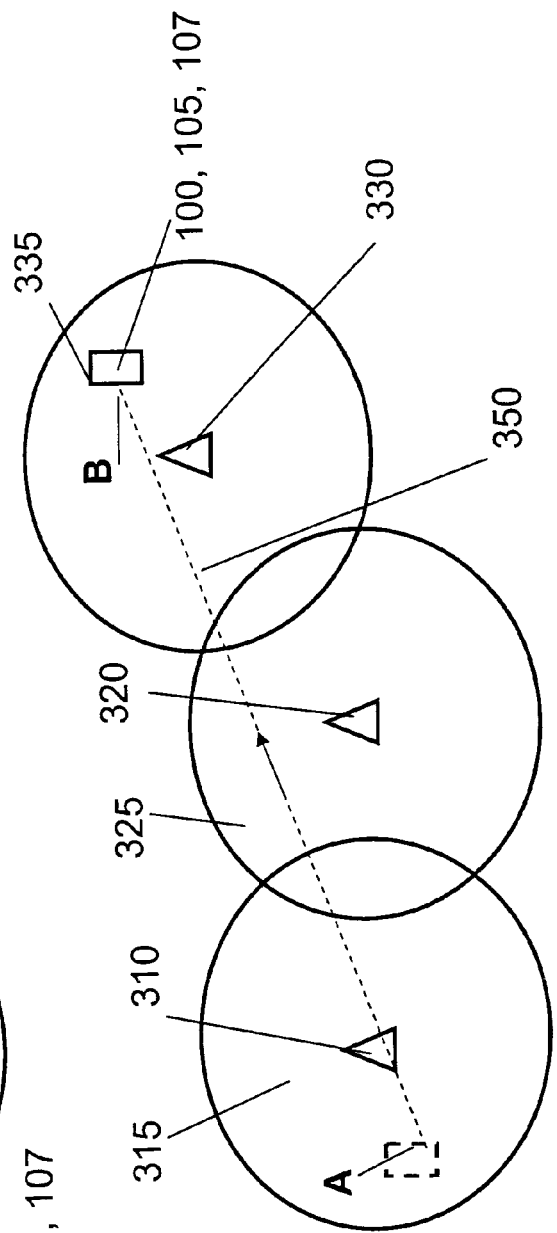
Fig. 3a
Fig. 3b

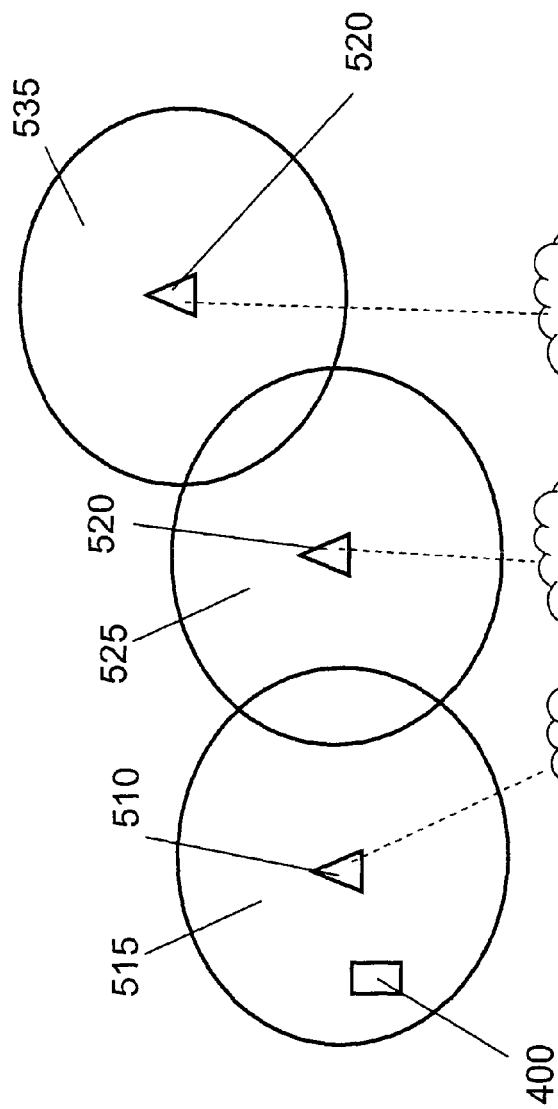
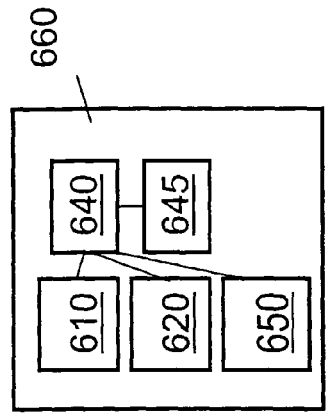
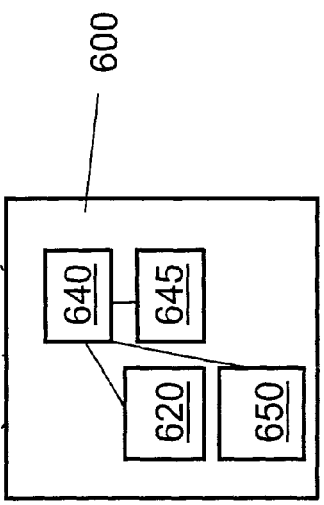
Fig. 4a
Fig. 4b

APPARATUS FOR ASSISTING IN PROVIDING A FIRST FIXING GLOBAL POSITIONING SATELLITE SYSTEM, ASSOCIATED APPARATUS AND METHODS

CROSS REFERENCE TO RELATED APPLICATIONS

This application is the U.S. National Stage of International Application Number PCT/EP2008/003373 filed on Apr. 25, 2008 which was published in English on Oct. 29, 2009 under International Publication Number WO 2009/129826.

TECHNICAL FIELD

The present invention relates to the field of apparatus for assisting in providing a first fix (e.g. a first geographical position fix) of a portable electronic device using a so-called Global Navigation Satellite System (or global positioning satellite system) e.g. GPS, GLONASS, Galileo, or a Regional Navigational Satellite System e.g. IRNSS, QZSS, Beidou.

The term "global" positioning satellite system can be considered to refer to systems which provide a position on the planet/globe and should not necessarily be limited to systems which provide a position anywhere on the planet/globe i.e. thus encompassing regional positional satellite systems which can provide positions within particular regions and not outside those regions.

In certain embodiments, such apparatus may be provided with a GNSS receiver (e.g. a GPS receiver) whereas in other embodiments, such apparatus may be provided with/in a portable communications device, such as a portable cellular communications device, which may comprise a GNSS receiver. Such apparatus may be provided as modules for these or other devices.

The devices may or may not be hand-held in use (although the devices may be placed in a cradle in use). In certain circumstances, such apparatus may be incorporated into hand-portable devices that provide additional functions, such as navigation functions provided by a navigation system, including Personal Navigation Devices (PNDs), and/or functions such as those provided by so-called Personal Digital Assistants (PDAs). The modules may also themselves provide the additional communication functions.

For example, such portable electronic devices/apparatus may provide one or more audio/text/video communication functions (e.g. telecommunication, videocommunication, and/or text transmission (Short Message Service (SMS)/Multimedia Message Service (MMS)/emailing) functions), interactive/non-interactive viewing functions (e.g. web-browsing, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions. Such devices/apparatus are being provided with communication capabilities, such as those provided by IEEE 802 family (e.g. WiFi, WiMax, etc.) and/or and mobile cellular communication (GSM, UMTS, etc.).

BACKGROUND OF THE INVENTION

Devices/apparatus for providing for global positioning/navigation using satellite systems require the ability to receive and decode a number of communication signals from a number of satellites. For the sake of convenience, the foregoing discussion and examples will be focussed around GPS and associated portable electronic devices (e.g. GPS receivers, portable communications devices, including mobile telephone and the like), but it will be appreciated that the invention is not limited to any particular GNSS or portable electronic devices.

During initiation of a positioning request, the device/receiver should be able to identify at least four visible satellites from data provided by GPS signals being received from satellites. From the data provided from one or more satellites, the further visible satellites can be determined (i.e. using received almanac data, which can take in excess of 12 minutes to download).

As known, such devices/receivers rely on both almanac and ephemeris data in establishing a geographical position. It will be appreciated that almanac data provides course orbital parameters for all satellites in the GPS constellation. This data is not particularly accurate, but it usually remains valid for several months. In contrast, ephemeris data provides more precise orbital parameters that, together with clock corrections for each satellite, are required for precise positioning, e.g. for a 3D geographical position fix. Each satellite broadcasts its ephemeris data, which broadly speaking has a life span of approximately four hours.

As mentioned above, each identified satellite is able to provide precise ephemeris data for that particular satellite. This is used in conjunction with data relating to the time of transmission of a signal from that satellite to assist in providing for a geographical position of the device/receiver, or to assist in providing for a so-called fix.

Without having prior knowledge of the locations of particular satellites in relation to the device/receiver (e.g. knowledge of those satellites that should be in view to the device/receiver), the device/receiver must perform laborious acquisition processes of received signals in order to ascertain which particular satellites are available to provide for a first fix.

Having prior knowledge of the particular satellites that are visible from a particular position (e.g. visible in the overhead sky to a device/receiver on the surface of the earth), allows the device/receiver to quickly identify those particular satellites, and provide, or in other words determine, the precise geographical location of the device/receiver.

To determine which particular satellites are visible, the device/receiver has some knowledge of the satellite orbit data (e.g. Almanac and/or Ephemeris), an estimate of the Satellite system time and an approximate estimate of the receiver's location.

The listing or discussion of a prior-published document or any background in this specification should not necessarily be taken as an acknowledgement that the document or background is part of the state of the art or is common general knowledge. One or more aspects/embodiments of the present invention may or may not address one or more of the background issues.

SUMMARY OF THE INVENTION

In a first aspect, there is provided a method for assisting in providing a first fix in a global positioning satellite system, the method comprising: storing of connection point association data for a network connection point, observed by a portable electronic device, for subsequent use in assisting in providing a first fix, the connection point association data providing for approximation of the position of a device at the observed network connection point by associating together connection point identifiers of the observed network connection point and one or more other network connection points to allow for positional data used for determining the position at one or more other network connection points to be used for the approximation of the position of the device at the observed network connection point.

The approximation of the position of the device may be the initial approximation of the position of the device.

The method may comprise associating together the observed network connection point identifier with network connection point identifier(s) of one or more other network connection points that are in the vicinity of the observed network connection point:

The connection point association data may comprise (e.g. additionally comprise) data provided from neighbour list data. The neighbour list data may be observed from a particular connection point. The neighbour list data may comprise data relating to neighbouring connection points (e.g. neighbouring connection point identifiers).

The method may comprise associating together the observed network connection point identifier with network connection point identifier(s) of one or more other network connection points whose corresponding communication areas are next to the communication area of the observed network connection point (e.g. adjacent, overlapping, etc communication areas).

The method may further comprise using connection point location data of one or more other network connection points and connection point association data of the observed network connection point and the one or more other network connection points, the connection point location data comprising network connection point identifier(s) and positional data, the positional data being associated with other network connection points, so as to allow for positional data used in determining the position at one or more other network connection points to be used for the (initial) approximation of the position of the device at the observed network connection point.

The method may further comprise using the positional data of the other network connection point and time data to assist in providing a first fix for a portable electronic device using a global positioning satellite system. The time data may be GPS time data, or may be device time data, network time data or the like. The positional data may be used with almanac data and the time data to approximate the satellites (and possibly their Doppler frequency offsets) that would be visible in the sky to the device.

The method may further comprise storing of connection point location data, provided by a portable electronic device, to provide for subsequent use in assisting in providing a first fix.

The connection point location data may be stored on one of: a portable electronic device; a server for communication with the portable electronic device; a server for communication with network connection points for communication with the portable electronic device; network equipment for network connection points for communication with the portable electronic device.

The connection point association data may be stored on one of: a portable electronic device; a server for communication with the portable electronic device; a server for communication with network connection points for communication with the portable electronic device; network equipment for network connection points for communication with the portable electronic device.

The connection point association data may be stored on a device other than that which observes the relevant network connection point. For example, the device may observe the relevant network connection point, and the connection point association data may be stored on a remote server, which may be in communication with the device. The connection point association data may be available to the device for the server for subsequent use. The connection point association data may provided by a plurality of devices, each in communication with the remote server. The connection point association data may be available to one, some or all devices in communication with the remote server.

The connection point association data may be stored on a device which observes the relevant network connection point. This data may later be transferred to one or more central source/server and/or retained within the device for subsequent use.

The positional data used for determining position(s) at one or more other network connection points may be data used to defining the location at other network connection points. For example, the positional data may be data pertaining to the geographical location of a device at other network connection points, such as longitude, latitude, etc. (e.g. altitude), data relating to the navigation frame, etc.

The positional data used for determining position(s) at one or more other network connection points may be data relating to one or more GNSS systems (e.g. GPS data for a particular satellite observed at one or more other network connection points).

The connection point association data may further comprise signal variable data for each associated network connection point. The signal variable data may be used for assisting in the association of network connection point identifiers. The signal variable data may be one of: received signal strength; time of flight, such as timing advance or round trip time.

The portable electronic device may be: a module for a navigation system; a module for a tracking system; a module for a mobile telephone; a navigation system; a tracking system; a mobile telephone.

The network connection point(s) may be at least one of: cellular base station access point; wireless network connection.

According to a second aspect there is provided an apparatus for assisting in providing a first fix in a global positioning satellite system, the apparatus comprising: a communicator configured to receive a network connection point identifier for a network connection point, observed by a portable electronic device; and an associator configured to provide for connection point association data, the connection point association data providing for approximation of the position of a device at the observed network connection point by associating together connection point identifiers of the observed network connection point and one or more other network connection points to allow for positional data used for determining the position at one or more other network connection points to be used for the approximation of the position of the device at the observed network connection point.

The associator may be configured to associate network connection point identifiers of network connection points that are in the vicinity of each other. For example, the associator may be configured to associate connection points whose corresponding communication areas are adjacent, overlapping, etc.

The apparatus may further comprise an approximator. The approximator may be configured to use connection point location data of one or more other network connection point and connection point association data relating to the observed network connection point and one or more other network connection points, the connection point location data comprising a network connection point identifier and positional data used for determining the position at one or more other network connection points. The approximator may be configured to provide positional data to be used for the approximation of the position of the device at the observed network connection point.

The associator may be further configured to provide for the connection point location data by associating receiving network connection point identifiers for network connection points from the communicator and positional data from a positioning receiver.

The apparatus may further comprise a positioning receiver, which may be configured to receive positioning signals from a global positioning satellite system, or the like.

The communicator may be further configured to receive network connection point signal variable data for a network connection point, observed by a portable communications device. The associator may be further configured to use the signal variable data to assist with association of the network connection point identifier(s) of the network connection point and the one or more other network connection points.

The received network signal variable data are one of: received signal strength, time of flight, such as timing advance or round trip time.

The apparatus may be comprised with: a portable electronic device; a server for communication with a portable electronic device; a server for communication with network connection points for communication with portable electronic device(s); network equipment for network connection points for communication with the portable electronic device.

The portable electronic device is one of: a module for a navigation system; a module for a tracking system; a module for a mobile telephone; a navigation system; a tracking system; a mobile telephone.

According to a third aspect there is provided an accessible database, stored on a machine readable medium, comprising connection point association data, complied according to any of the first aspect.

The database may be accessible to one of: a portable electronic device, and a portable electronic device over a network.

According to a fourth aspect there is provided a computer program, stored on a machine readable medium, the computer program comprising one of: computer code to implement any of the first aspect, and computer code to provide the database according to any of the third aspect.

According to a fifth aspect there is provided a system comprising a server, a plurality of network connection points and one or more portable communications devices comprising the apparatus of any of the second aspect and configured to implement any of the first aspect.

According to a sixth aspect there is provided a means for an apparatus for assisting in providing a first fix in a global positioning satellite system, the means for apparatus comprising: a means for communicating configured to receive a means for identifying a means for connecting to a network, observed by a means for portable communications; and a means for association configured to provide for connection point association data, the connection point association data providing for approximation of the position of a means for communication at the observed means for connecting to a network by associating together means for identifying a means for connecting to a network of the observed means for connecting to a network and one or more other means for connecting to a network to allow for positional data used for determining the position at one or more other means for connecting to a network to be used for the approximation of the position of the means for communications at the observed means for connecting to a network.

The present invention includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIG. 1, comprising Figures 1a-1c, shows electronic devices;

FIG. 2 shows a plot of an electronic device, a network connection point (for background understanding), and associated communication area (or cell);

FIG. 3, comprising FIGS. 3a and 3b, shows an embodiment comprising a number of network connection points/cells;

FIG. 4, comprising FIGS. 4a and 4b, shows a similar embodiment to that of FIG. 3, comprising a server;

DESCRIPTION OF SPECIFIC EMBODIMENTS

Figure 5:
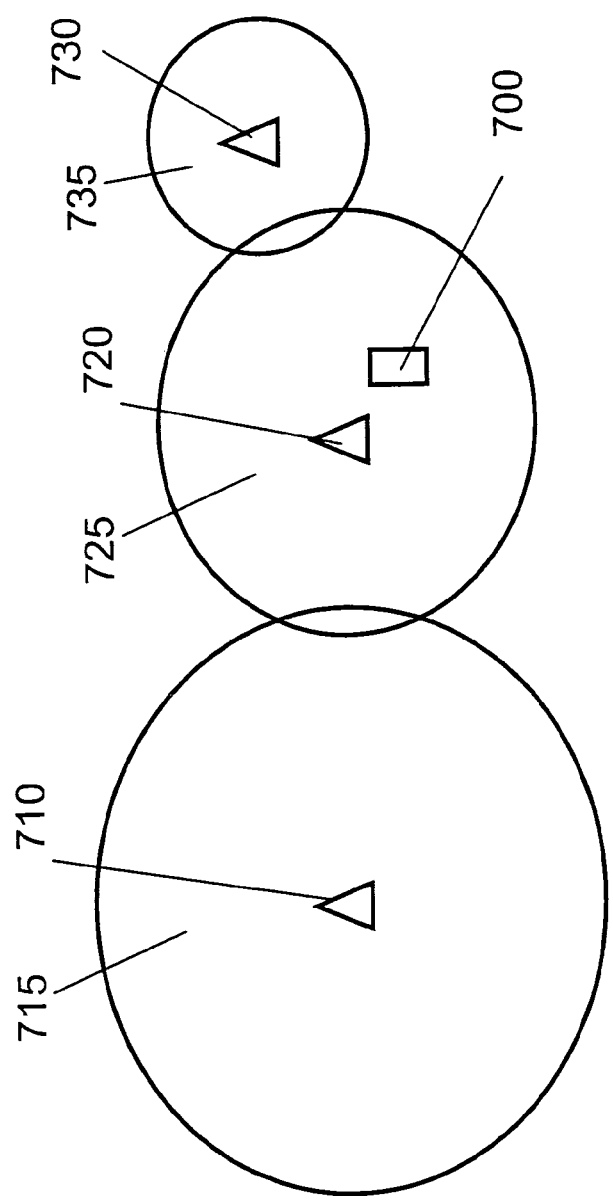
FIG. 5 shows a further embodiment comprising a number of network connection points/cells.

FIG. 1a shows a portable electronic device 100, comprising a positioning receiver 110 configured to receive satellite positioning signals from a global navigation satellite system (or global positioning satellite system), so as to provide for a geographical position of the electronic device 100.

A skilled reader will appreciate that the term global 'navigation' satellite system, which is used in common parlance, is taken to mean a system providing for positioning, as well as providing for navigation. Thus this term should not be construed narrowly to mean providing only for navigation.

The device 100 further comprises a communicator 120, which in the present embodiment is provided by a receiver that is able to observe network connection points, such as: observe mobile cellular network connection points (e.g. UMTS, GSM, etc. base station); observe wireless network connection points (e.g. WLAN access point, WiMax, Bluetooth or other wireless access point); and observe communication transmitters (e.g. DVB, DAB transmitters, etc.).

The device 100 further comprises a processor 140 and memory 145, configured in a known manner, to provide for processing and control of the receiver 110 and communicator 120.

The memory 145 and the processor 140 are further configured to receive/store/provide positional data (i.e. data used for determining the position of the device 100) to/from the receiver 110, such data including almanac data, ephemeris data, longitude/latitude/altitude, time data, navigation frame data, etc. The memory 145/processor 140 are configured to process received satellite positioning signals from the receiver 110, so as to provide for an approximate position of the device 100.

The device further comprises an associator 150, configured to associate data received by the communicator 120, and in some cases associate data received by the communicator 120 and the receiver 110, as will be further described.

FIG. 1b shows a further embodiment of the device 105, in which the device 105 further comprises a user interface 130.

The user interface 130 is configured to provide for user input/output with the communicator 120 and receiver 110 (e.g. comprising audio input/output, visual display, key input, etc.). The device 105 comprises the processor 140 and memory 150, configured in a known manner, to provide for processing and control of the receiver 110, communicator 120 and user interface 130.

The device of FIG. 1c shows a further embodiment of the device, similar to that of FIG. 1b, in which a communicator 125 is configured as a transceiver. The communicator 125 is configured to observe network connection points, and also provide communication thereto/therefrom, such as: to and from mobile cellular network connection points (e.g. UMTS, GSM, etc. base station); to and from wireless network connection points (e.g. WLAN access point, WiMax, Bluetooth or other wireless access point); and from communication transmitters (e.g. DVB, DAB transmitters, etc.).

It will be appreciated that the arrangement of the device 100 in FIG. 1a may be provided with, for example, a GPS receiver device, such as that comprised with a navigation system (e.g. vehicle navigation system, tracking navigation system, etc.), or the like. The arrangement of the device 105 in FIG. 1b may be comprised with a portable navigation device, such as a hand-held navigation device, or the like. The device 107 of FIG. 1c may provide (amongst other functions) cellular communication, such as being a comprised with mobile telephone device, or the like.

It will readily be appreciated that while in the above arrangements, the processor 140, associator 150, memory 145, receiver 110, communicator 120, 125 are described as distinct, in other embodiments this need not be the case. For example, the associator 150 and the processor 140 may be provided by a single apparatus. Similarly, the receiver 110 may be comprised with the communicator 120, 125, or the like. In some embodiments, a number of components (e.g. the associator 150, processor 140 and memory 145) may be comprised on a single apparatus, such a Field Programmable Gate Array, Application Specific Integrated Circuit, or the like. A person skilled in the art will readily appreciate such further arrangements.

FIG. 2 shows a plot of a network connection point 210 (in this exemplary described arrangement the connection point is a cellular base station) for background understanding, and its associated communication area 220, or so-called cell, which here is wireless. Here, the cell 220 is shown as roughly circular, with the connection point 210 being provided roughly at the centre of the cell 220 (e.g. provided for by an omni-directional antenna, or the like). Other cell configurations may be provided, such as those provided by directional antenna (i.e. the cell 220 not being roughly circular and/or the connection point 210 not being provided at the centre of the cell 220).

FIG. 2 further shows a device 107 (which may or may not be a device according to the present invention) positioned within the communication cell 220 of the network connection point 210. In this arrangement, the communicator 120 of the device 107 is configured to observe, and communicate with, the network connection point 210 when within the cell's particular communication area/cell 220. Such an arrangement is able to provide for mobile cellular communication between the device 107 and a further network (not shown), in a known manner.

The network connection point 210 is provided with an identifier (e.g. a unique identifier). The identifier is visible to the communicator 120; at least when the device 107 is within the communication area 220. In this exemplary arrangement, the identifier for the network connection point 210 is provided by a particular Cell-ID.

In use, the device 107 is able to communicate with the particular network connection point 210 in order to determine its particular identifier. Once determined, the identifier can be used for communication with the network connection point 210 and beyond.

When the receiver 110 of the device 107 is enabled, the device 107 is able to provide a geographical position of the device 107 by acquiring, and resolving satellite navigation signals (e.g. GPS signals). It will readily be appreciated that when the processor 140 is asked to resolve the location of the device 107, without prior knowledge of roughly its present location, and potentially the GPS time (e.g. without knowledge of potentially visible satellites, which may include their locations), a full sky search may be required. This may cause unhelpful delays in the acquisition of satellite(s). In other words, the time to first fix is relatively long.

To assist in reducing the time to subsequent first fixes in that cell 220, the associator 150 is configured to associate the positional data of the device 107 (i.e. data used for determining the geographical position of the device 107, e.g. geodetic data, navigation frame data, etc.) with the particular identifier of the cell 220. This association of positional data and connection point identifier provides connection point location data.

In pseudo-terms, the connection point location data may comprise data such as:

Cell-ID 1 is associated with a position at 35.786547° N, 110.987456° W

That is to say, for example, that during subsequent first fixes in that cell, a device 107 may observe the Cell-ID and use the previously associated connection point location data, to provide an approximation of the positional data of the device 107. The approximation of the positional data can be subsequently used as a suitable starting point in obtaining first fix.

For example, the positional data may comprise geographical location data (e.g. longitude/latitude as above) of a locality in that cell 220. Such geographic positional data may be used with almanac data (e.g. stored on memory 145 of the device 107) and time data (e.g. GPS time data), to approximate the location/movement of particular satellites that should be visible in the sky at that time. In such an arrangement, the acquisition time of satellites by the device 107 (and as a result the time to first fix) may be reduced, as the device 107 may be able to assess which particular satellite (i.e. which PRNs to use for decoding) and which approximate Doppler frequency offsets should be used for received signals.

In such an arrangement, the time taken to acquire a first fix may be reduced, for example when compared to the time to first fix using a full sky search.

FIG. 3a shows an embodiment of the present invention in which there are shown three network connection points 310, 320, 330 (a first 310, a second 320, and a third 330), each of which have an associated communication area 315, 325, 335, or so-called cell 315, 325, 335. In the present embodiment, the communication area/cell 315 of the first connection point 310 partially overlaps the communication area/cell 325 of the second connection point 320. Similarly, the communication area/cell 325 of the second connection point 320 partially overlaps the communication area/cell 335 of the third connection point 330.

In a similar manner to that above, each network connection point 310, 320, 330 is provided with an identifier (e.g. a unique identifier, such as a Cell-ID). In such an arrangement the communicator 120, 125, of the device 100, 105, 107 (described in relation to FIG. 1, and as shown in FIG. 3a within the communication area/cell 315 of the first connection point 310) is able to observe the identifier of the particular network connection point, at least when the device 100, 105, 107 is within that particular communication area 315, 325, 335.

In this embodiment, the associator 150 is configured to associate data observed/received by the communicator 120, 125 to provide for connection point association data. Here, the associator 150 is configured to associate particular Cell-IDs observed by the communicator 120 to provide for connection point association data, as will be described.

In use, the communicator 120, 125 of the device 100, 105, 107 is able to observe each particular network connection point 310, 320, 330 in order to ascertain their particular identifiers. That is to say that, irrespective of whether the device 100, 105, 107 is in communication (e.g. cellular communication in the case of the device 107 as shown in FIG. 1c) with a particular network connection point 310, 320, or 330, the device 100, 105, 107 (when the communicator 120, 125 is enabled) is still able to observe (at least) the identifier of that particular connection point 310, 320, 330. At a similar time, the device 100, 105, 107 (when the receiver 110 is enabled) is able to provide a geographical position by acquiring, and resolving GPS signals.

Again, when the receiver 110 is within a particular cell (the first cell 315 as shown in FIG. 3a) and when the receiver 110 is enabled so as to resolve the location of the device 100, 105, 107, the device 100, 105, 107 is configured to observe the Cell-ID and use previously obtained positional data, derived from previously obtained connection point location data associated with that Cell-ID, to assist in obtaining a first fix. Here, the previous positional data is used with time data, and almanac, ephemeris data, etc., as described above.

It will be appreciated that the connection point location data may be stored on the device 100, 105, 107, or may be stored on a remote server, accessible to the device 100, 105, 107 (e.g. wirelessly using a communicator 125 and the network connection point 310, 320, 330)

In addition, when in use (and moving as shown in FIG. 3b) the communicator 120, 125 is configured to observe network connection point identifiers for each cell 315, 325, 335 through which the device 100, 105, 107 passes (e.g. Cell-ID 1, Cell-ID 2, Cell-ID 3). As mentioned above, the associator 150 is configured to provide connection point association data using these connection point identifiers.

For example (and as shown in FIG. 3b), as the device 100, 105, 107 transits along path 350 from 'A' to 'B', the associator 150 is configured to associate the observed first connection point 310 identifier (e.g. Cell-ID) with the observed second connection point 320 identifier, and further associate the observed second connection point 320 identifier with the observed third connection point 330 identifier.

In pseudo-terms, the connection point association data may comprise data such as:
Cell-ID 1 is next to Cell-ID 2
Cell-ID 2 is next to Cell-ID 3

In the embodiment in which the device of FIG. 1c is used (e.g. a mobile telephone) this association may occur as handover between cells occurs when the device 107 transits from A to B. The connection point association data therefore provides data that associates one cell (or cell identifier) with another particular cell (or cell identifier), which in the present embodiment are cells in the vicinity of one another. Such association is done to the extent that associated cells can be used to provide for a reasonable approximation of each other's geographical position, and thus be useful in reducing/minimising first to fix time.

While in the above embodiment, the associator 150 is configured to associate the observed first connection point 310 identifier (e.g. Cell-ID) with the observed second connection point 320 identifier, etc. as a result of the device 100, 105, 107 transiting from one cell to the next (e.g. 315 to 325), in other embodiments the associator 150 may be configured to associate the observed first connection point 310 identifier with other connection point 320 identifier(s), even when not transiting.

In some embodiments, the associator 150 may be configured to associate Cell-IDs of further connection point(s) from observed so-called "neighbour lists" provided by a particular connection point. The skilled reader will readily appreciate that in the case of cellular connection points, for example, the "neighbour list" provides data (e.g. Cell-IDs, etc.) of connection points in the vicinity of that connection point. This data is provided for portable communication devices (e.g. device 107) such that they may determine when to handover, and to which connection point to handover (i.e. handover being the changing of the connection point through which such a device communicates with the further network). It will be appreciated that such a device can use this neighbour list, and other factors such as signal quality to assist with the decision process.

Therefore in further embodiments, the communicator 120, 125 may be configured to observe the neighbour list of a particular connection point (irrespective of whether the device 100, 105, 107 is a cellular device 107, or the like). The associator 150 may be configured to associate neighbour list data observed/received by the communicator 120, 125 to provide for connection point association data. This may be in addition to providing for connection point association data when transiting from one cell to another cell.

It will readily be appreciated that while each cell shown in FIG. 3 at least partially overlaps another cell, that in other embodiments that need not be the case. In some instances, cells 315, 325, 335 may not overlap. In such cases, the association may not be provided during, for example, handover, but may be provided by observing the last known cell identifier and the next subsequent known cell identifier. Similar arrangements may be provided if there is a loss of signal from a network connection point (e.g. over a short time period, such as that which might be experienced when driving through a tunnel).

Consider the situation when the receiver 110 has been disabled (e.g. powered off, or placed in a standby mode) such that the receiver 110/device 100, 105, 107 is not processing/tracking satellite signals, and the communicator 120, 125 is enabled (e.g. able to observe (at least) the/each identifier), and the device 100, 105, 107 travels from 'A' to 'B'. In such a case, the device 100, 105, 107, when the receiver 110 is subsequently enabled, has no previous connection point location data associated with that particular network connection point 330.

In such an arrangement, when the receiver 110 is enabled (so as to provide its geographical position), rather than conducting a full sky search, the device 100, 105, 107 is able to use the connection point association data provided for by the associator 150 to identify other cells that are in the vicinity. The device 100, 105, 107 is then able to use connection point location data that exists for those other connection points/cells (e.g. positional data of the first connection point 310, which may be considered to act as a proxy), so as to provide approximate positional data for the presently observed connection point.

A skilled reader will readily appreciate that, in some embodiments, the device 100, 105, 107 may be configured such that the approximate positional data is derived only from neighbouring cells (i.e. those cells adjacent/overlapping the present cell) for which there is connection point location data. In other embodiments, the relevance of connection point location data may be weighted. Such weighting may be based on, for example, the displacement (in cell terms) of one cell from another cell for which there is connection point location data.

It will readily be appreciated to a skilled reader that the above described arrangement may be particular useful to the user of a device 100, 105, 107, in which the associator 150 is able to provide connection point association data (e.g. a database, such as a spider-web database) to be used when the device 100, 105, 107 has no previous positional data associated with use by the receiver 110 and communicator 120, 125 in that particular area/cell. A skilled reader will readily appreciate that such an arrangement may allow for the receiver 110 of a device 100, 105, 107 to be powered down, when not in use, and still provide for a reduced time to first fix by using the connection point association data. Such an arrangement may allow for battery consumption to be reduced, as well as removing the requirement from continuously tracking movement.

It will readily be appreciated that, in the above embodiment, the associator 150 may be, or may not be, configured to provide connection point location data, but may still be configured to provide connection point association data. In some arrangements, the device 100, 105, 107 may be configured to use/receive connection point location data from a remote server (e.g. a remote server in communication with the present network connection point 310, 320, 330) as, for example, discussed in relation to FIG. 4. Similarly, the connection point location data may not be stored on the device 100, 105, 107, but may be provided to a remote server for storage/retrieval, by that device or by a number of such devices.

FIG. 4a shows a further embodiment, similar to that described above, comprising three network connection points 510, 520, 530, each associated with a particular communication area 515, 525, 535, or so-called cell. Again, each network connection point 510, 520, 530 is provided with an identifier (e.g. a unique identifier, such as a Cell-ID). In this embodiment, each network connection point 510, 520, 530 is in communication with a server 600. Each network connection point 510, 520, 530 is in communication with the server 600 via respective (wired, wireless, or mixed) communication paths/networks 517, 527, 537. It will be appreciated that each communication path may comprise further network equipment, such a routers, further servers, network connection points, etc.

Here, the server 600 comprises a processor 640, memory 645, an associator 650, and a communicator 620. In this embodiment, the communicator 620 is configured to receive, via the various communication paths 517, 527, 537, identifiers observed by a, or a plurality of, devices 400 (device 400 being similar to device 100, 105, 107 described previously) to provide connection point association data. This data is then stored on the memory 645 and is accessible by device(s) 400 which can communicate with the server 600.

In further embodiments a server 660 (as shown in FIG. 4b) may be provided with a receiver 610, configured to receive various global navigation/positioning satellite signals (e.g. data of such signals) from the device 400, so as to provide for connection point location data via respective (wired, wireless, or mixed) communication paths/networks 517, 527, 537.

That is to say that, in this embodiment, a device 400 is configured to communicate the various global navigation/ positioning satellite signals (e.g. pseudoranges, or signals/ data such that pseudoranges can be determined, etc.) to the server 660 for processing such that the server 660 derives positional data. However, in other embodiments, the device 400 may be configured to communicate the positional data itself to the server 600 for association with cell identifiers for providing connection point location data.

In use, the device 400 is configured to communicate a request for positional data/approximate positional data to the server 600, 660. The device 400/connection point 510 is further configured to communicate the identifier of the particular connection point 510 to the server 600, 660. The server 600, 660 is configured to use the particular identifier for the cell 515 in which the device 400 is located. The server 600, 660 is configured to identify if there are any previous positional data for that particular cell. Otherwise, the server 600, 660 is configured to provide approximate positional data (i.e. positional data for a different cell, such as a different cell in the vicinity) by using the connection point association data, which may include data derived from a neighbour list of that particular connection point.

It will readily be appreciated that in such an arrangement, the device 400 need not comprise the associator 150 of FIG. 1. Similarly, that in further embodiments the server 600, 660 may be configured to store connection point location data, while the device 100, 105, 107, 400 may be configured to store connection point association data, or visa versa. Additionally/alternatively connection point location data may be provided by further server(s), or the like. A person skilled in the art would readily be able to implement such further embodiments.

It will be appreciated that any of the time data, almanac (or partial almanac data), ephemeris data, etc. may be stored on the memory 145/150 of the device 100, 105, 107, 400 (e.g. received-during/calculated-from a previous receipt of data from a satellite), or may be provided to the device 100, 105, 107, 400 via a network connection point 310, 320, 330, 510, 520, 530 (e.g. provided by the server 600, 610). When such data is stored on the device 100, 105, 107, 400, the device 100, 105, 107, 400 may be configured to use the data for only a particular length of time (e.g. 2 to 4 hours for ephemerides).

For example, the positional data may comprise almanac/ ephemeris data (e.g. data for a particular satellite) obtained during previous use of the receiver 110 in a particular cell. Such data may be used to identify that that particular satellite might be visible in the sky. In such an arrangement, the acquisition time for that satellite by the device 100, 105, 107, 400 (and as a result the time to first fix) may be reduced, as the device 100, 105, 107, 400 may be able to assess the particular PRNs to use for decoding, and possibly which approximate Doppler frequency offsets should be used for received signals.

In some embodiments, the device 100, 105, 107, 400 may be configured to receive ephemerides/almanac/GPS time data, etc. by connecting to a further network (e.g. a wired network provided when the device 100, 105, 107, 400 is connected to a home PC, or the like).

FIG. 5 shows a further embodiment in which there is provided three network connection points 710, 720, 730 (a first 710, a second 720, and a third 730). Each network connection point 710, 720, 730 is associated with a corresponding communication area 715, 725, 735, or so-called cell. In the present embodiment the first cell 715 is larger (geographically speaking) than the second cell 725, and the second cell 725 is larger than the third cell 735. In this arrangement (and as shown in FIG. 5), the third connection point 730 is closer to the second connection point 720 than the first connection point 710.

In this embodiment, a device 700 is configured (in a similar manner to that described above) to observe the identifiers of each network connection point (e.g. observe the Cell-IDs of a particular connection point, and/or identifiers of connections points in a neighbour list), so as to provide for connection point association data. In addition, the device 700 is configured to observe signal variables to provide for the connection point association data.

For example, when the network connection points 710, 720, 730 provide GSM communication with the device 700, the device 700 is configured to additionally observe the timing advance communications with each particular connection point 710, 720, 730, so as to provide the signal variables. In this embodiment, as the device 700 passes from the first cell 715 to the second cell 725, it is able to provide an approximation as to the displaced relationship between the first and second connection points 710, 720. Similarly, when the device 700 passes from the third cell 735 to the second cell 725, it is able to provide an approximation as to the displaced relationship between the third and second connection points 730, 720.

In pseudo-terms, the (extended) connection point association data may comprise data such as:

Cell-ID 1 is next to Cell-ID 2; Cell-ID 2 is 6 km from Cell-ID 1

Cell-ID 2 is next to Cell-ID 3; Cell-ID 3 is 2 km from Cell-ID 2

In the arrangement in which there is provided connection point location data for both the first 715 and the third cell 735, but the device's 700 receiver is enabled in the second cell 725 (without connection point location data specifically relating to that cell), the device 700 is configured to use the connection point association data, which includes the signal variable, to assess which positional data to use.

In this embodiment, the device 700 is configured to use approximate positional data using the positional data of the third cell 735, given it's apparent closer proximity.

It will readily be appreciated that in other embodiments, additional/alternative signal variables may be used, such a received signal strength indictors (e.g. for 3G network connection points, WiMax, etc.), or the like.

Figure 6:
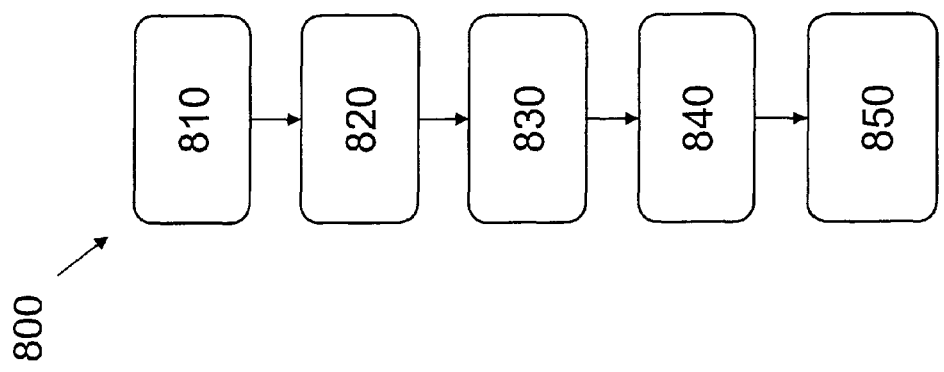
FIG. 6 shows a flow chart of the method for assisting in providing a first fix in a global positioning satellite system.

FIG. 6 shows a flow chart 800 outlining the method used for assisting in providing a first fix, in which there is using 810 a device (e.g. a portable electronic device, such as a GPS enabled mobile phone) to observe connection point identifiers (e.g. Cell-IDs). These identifiers are associated 820 with further identifiers of other connection points to provide connection point association data. The connection point association data is stored 830 (e.g. on a device 100, 105, 107, 400, 700 or a server 610, 620, for access by the device 100, 105, 107, 400, 700). The connection point association data can be used 840 to allow for positional data used for determining the position at one or more other network connection points (e.g. using previously obtained connection point location data for one or more other connection points) to be used for the approximation of the position of the device at the observed network connection point. The device 100, 105, 107, 400, 700 is able, using the approximate positional data (and in many instances time and almanac data) to identify 850 which satellites may be visible in the sky so as to assisting in providing a first fix.

It will be appreciated that in the above embodiment the identifier has been described as Cell-IDs, however in other embodiments, the identifiers may be any number of other identifiable features of a connection point, such as area codes, MAC/IP address, SSID etc.

It will be appreciated to the skilled reader that the device/server/apparatus and/or other features of particular apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory.

It will be appreciated that the aforementioned device/server/apparatus may have other functions in addition to the mentioned functions, and that these functions may be performed by the same device/server/apparatus.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A method, the method comprising:
   storing connection point association data for a network connection point observed by a portable electronic device for subsequent use in assisting in providing a first fix, wherein the connection point association data provides for approximation of the position of a device at the observed network connection point by associating together:

connection point identifiers of the observed network connection point, and
connection point identifiers of one or more other network connection points that are in the vicinity of the observed network connection point,
the connection point association data thereby allowing for positional data used for determining the position of a portable electronic device at the one or more other network connection points to be used for the approximation of the position of a device at the observed network connection point to assist in providing the first fix for the device at the observed network connection point in a global positioning satellite system.

2. A method according to claim 1, further comprising:
using connection point location data of one or more other network connection points and connection point association data of the observed network connection point and the one or more other network connection points, the connection point location data comprising network connection point identifier(s) and positional data, the positional data being associated with other network connection points, so as to allow for positional data used in determining the position at one or more other network connection points to be used for the approximation of the position of the device at the observed network connection point.

3. A method according to claim 2, further comprising:
using the positional data of the other network connection point and time data to assist in providing the first fix for the portable electronic device using a global positioning satellite system.

4. A method according to claim 2 further comprising storing of connection point location data, provided by the portable electronic device, to provide for subsequent use in assisting in providing the first fix.

5. A method according to claim 2 in which the connection point location data or the connection point association data is stored on one of: a portable electronic device; a server for communication with the portable electronic device; a server for communication with network connection points for communication with the portable electronic device; network equipment for network connection points for communication with the portable electronic device.

6. A method according to claim 1 in which the connection point association data is stored on a device other than that which observes the relevant network connection point.

7. A method according to claim 1, in which the positional data used for determining position(s) at one or more other network connection points are data used to defining the location(s) at other network connection points.

8. A method according to claim 1 in which the connection point association data further comprises signal variable data for each associated network connection point, the signal variable data being for assisting in the association of network connection point identifiers.

9. A method according to claim 8 in which the signal variable data are at least one of: received signal strength; time of flight.

10. A method according to claim 1 in which the portable electronic device is are at least one of: a module for a navigation system; a module for a tracking system; a module for a mobile telephone; a navigation system; a tracking system; a mobile telephone.

11. A method according to claim 1 in which the network connection point(s) are at least one of: a cellular base station access point; a wireless network connection.

12. An apparatus, the apparatus comprising:
a communicator configured to receive a network connection point identifier for a network connection point, observed by a portable electronic device; and
an associator configured to provide for connection point association data, the connection point association data providing for approximation of the position of a device at the observed network connection point by associating together connection point identifiers of the observed network connection point and one or more other network connection points that are in the vicinity of the observed network connection point, the connection point association data thereby allowing for positional data used for determining the position of a portable electronic device at the one or more other network connection points to be used for the approximation of the position of a device at an observed network connection point to assist in providing a first fix for the device at the observed network connection point in a global positioning satellite system.

13. An apparatus according to claim 12 in which the apparatus is comprised with: a portable electronic device; a server for communication with a portable electronic device; a server for communication with network connection points for communication with portable electronic device(s); or network equipment for network connection points for communication with the portable electronic device.

14. An apparatus according to claim 13 in which the portable electronic device is one of: a module for a navigation system; a module for a tracking system; a module for a mobile telephone; a navigation system; a tracking system; a mobile telephone.

15. A server comprising an accessible database, stored on a non-transitory machine readable medium and comprising connection point association data, compiled according to the method of claim 1.

16. A computer program, stored on a non-transitory machine readable medium, the computer program comprising computer code configured to implement, when executed by a computer, the method of claim 1.

17. A system comprising a server, a plurality of network connection points and one or more portable electronic devices comprising an apparatus of claim 12.

18. An apparatus according to claim 12, configured to implement a method, the method comprising:
storing connection point association data for a network connection point observed by a portable electronic device for subsequent use in assisting in providing a first fix, wherein the connection point association data provides for approximation of the position of a device at the observed network connection point by associating together:
connection point identifiers of the observed network connection point; and
connection point identifiers of one or more other network connection points that are in the vicinity of the observed network connection point,
the connection point association data thereby allowing for positional data used for determining the position of a portable electronic device at the one or more other network connection points to be used for the approximation of the position of a device at an observed network connection point to assist in providing the first fix for the device at the observed network connection point in a global positioning satellite system.

19. A computer program, stored on a non-transitory machine readable medium, the computer program comprising computer code configured to provide, when executed by a computer, an accessible database on the server according to claim 15.

* * * * *